United States Patent
Espejo

(10) Patent No.: US 10,723,298 B1
(45) Date of Patent: *Jul. 28, 2020

(54) DEVICE FOR PROTECTING THE BUMPER OF A VEHICLE AND METHOD OF USE

(71) Applicant: Enercio Antonio Espejo, Bronx, NY (US)

(72) Inventor: Enercio Antonio Espejo, Bronx, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/870,973

(22) Filed: Jan. 14, 2018

Related U.S. Application Data

(63) Continuation of application No. 15/082,033, filed on Mar. 28, 2016, now Pat. No. 9,902,353.

(60) Provisional application No. 62/178,461, filed on Apr. 11, 2015.

(51) Int. Cl.
*B60R 19/46* (2006.01)
*B60R 19/40* (2006.01)
*B60R 19/38* (2006.01)
*B60R 19/02* (2006.01)
*B60R 19/14* (2006.01)

(52) U.S. Cl.
CPC .......... *B60R 19/46* (2013.01); *B60R 19/023* (2013.01); *B60R 19/14* (2013.01); *B60R 19/38* (2013.01); *B60R 19/40* (2013.01)

(58) Field of Classification Search
CPC ....... B60R 19/14; B60R 19/023; B60R 19/38; B60R 19/40; B60R 19/46
USPC ........................................ 293/118
See application file for complete search history.

(56) References Cited

U.S. PATENT DOCUMENTS

| | | | | |
|---|---|---|---|---|
| 3,718,357 A * | 2/1973 | Hertzell | ............... | B60R 13/04 293/128 |
| 7,210,718 B1 * | 5/2007 | Budhu | ............... | B60R 19/38 293/114 |
| 7,316,433 B2 * | 1/2008 | Levine | ............... | B60R 13/10 293/102 |
| 7,338,100 B2 * | 3/2008 | Meyer | ............... | B60R 19/44 150/166 |
| 7,591,477 B2 * | 9/2009 | Pohler | ............... | B60D 1/00 280/502 |
| 9,308,880 B1 * | 4/2016 | Johnson | ............... | B60R 21/01 |

* cited by examiner

*Primary Examiner* — Joseph D. Pape
*Assistant Examiner* — Dana D Ivey
(74) *Attorney, Agent, or Firm* — Ted Masters

(57) ABSTRACT

A device for protecting the bumper of a vehicle having an undercarriage includes a bumper protector which is connectable to the undercarriage of the vehicle. The bumper protector includes a cushion which is positionable to (1) a retracted position beneath the undercarriage of the vehicle, and (2) an extended position outwardly projecting from the vehicle. In the extended position the cushion is rotatable to an upright position adjacent to the bumper of the vehicle. The cushion protects the bumper during a collision with another vehicle or object.

2 Claims, 11 Drawing Sheets

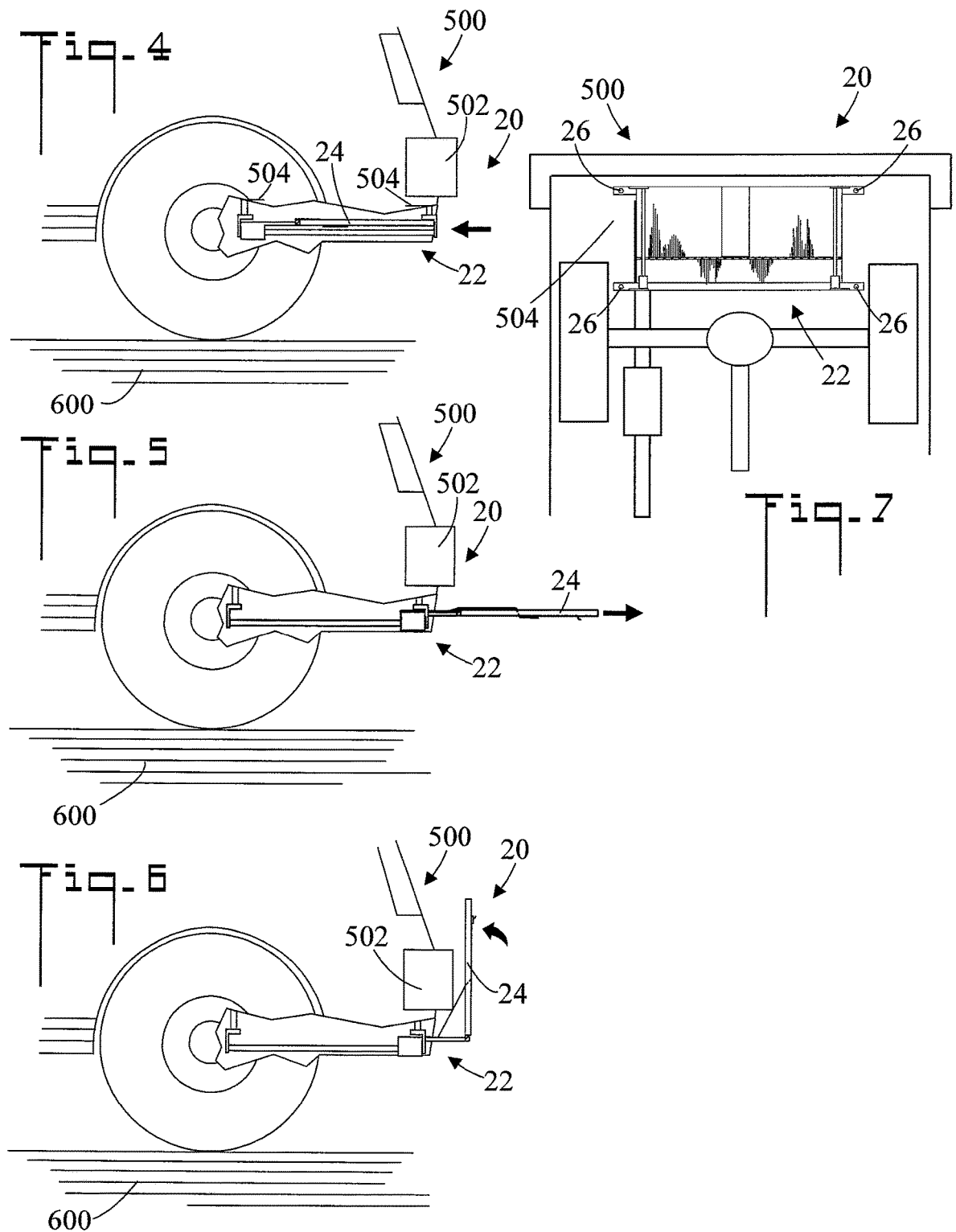

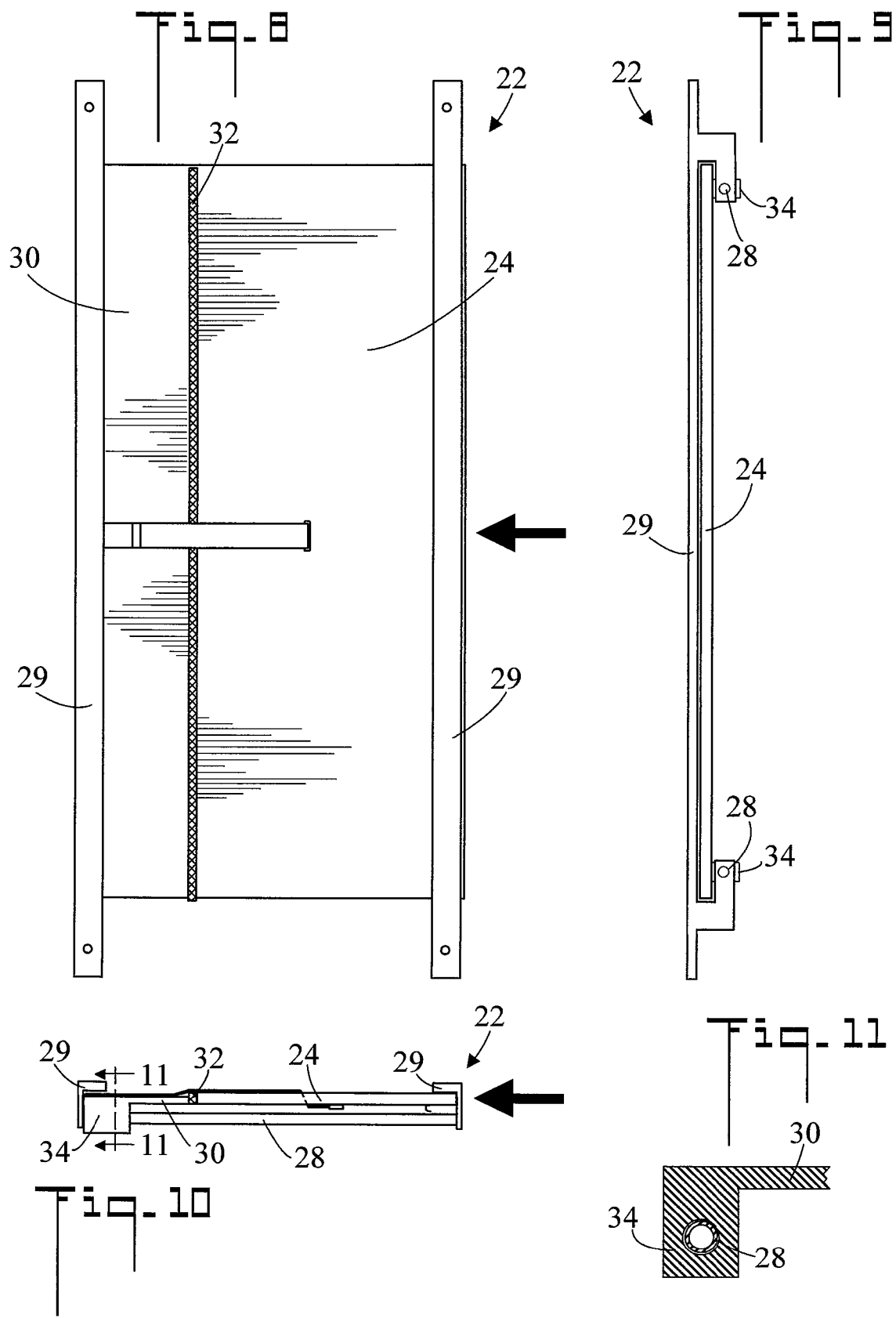

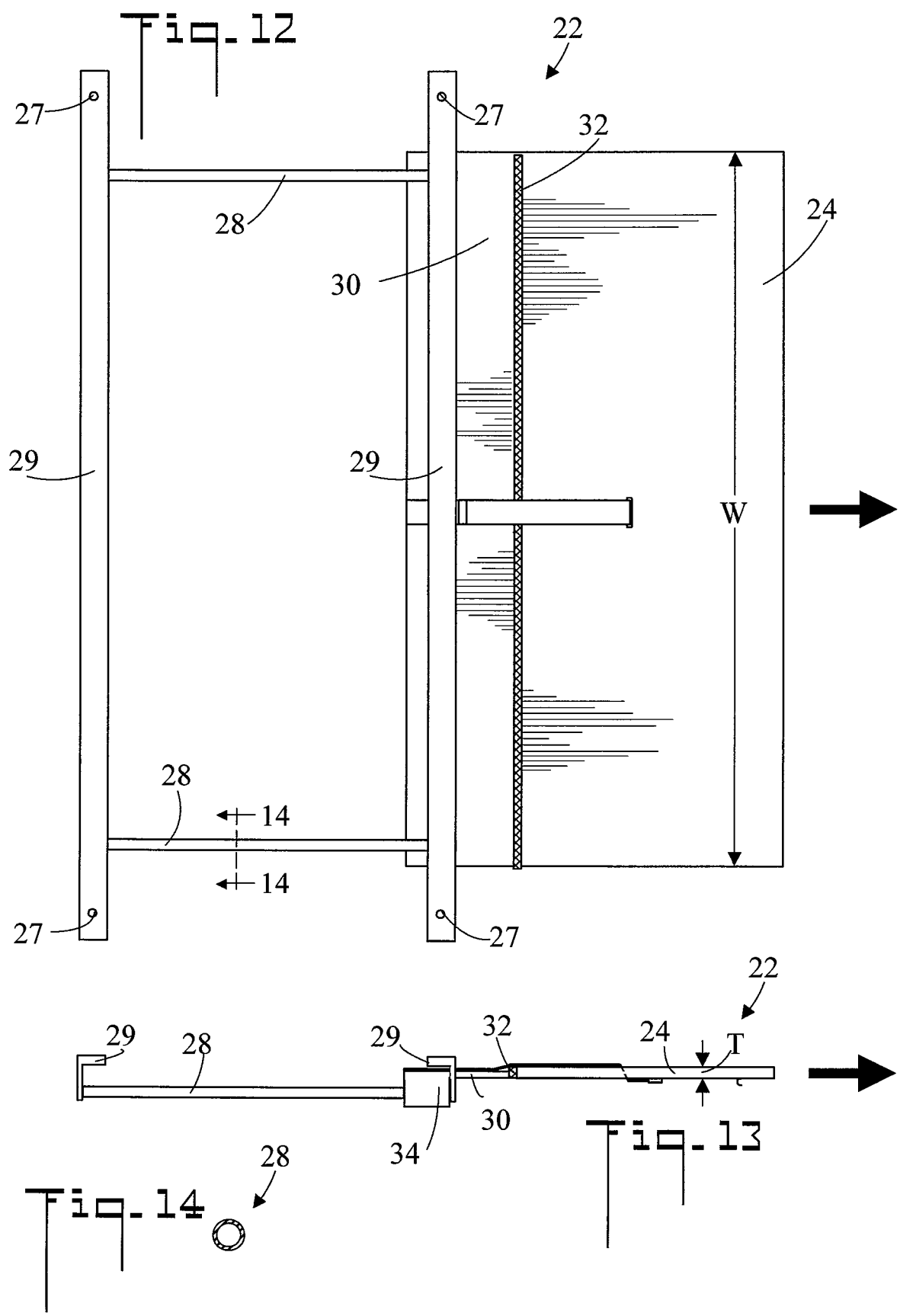

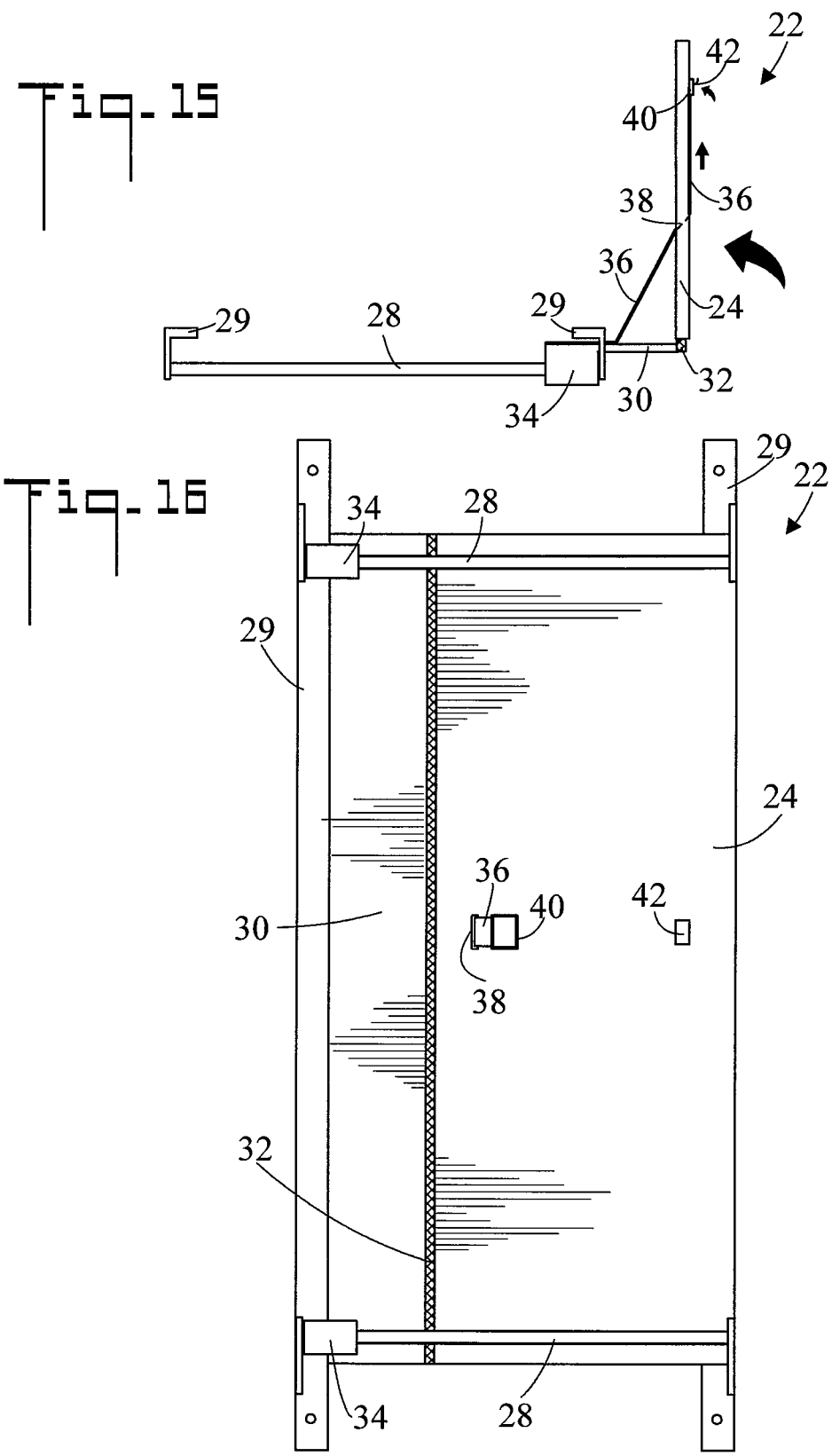

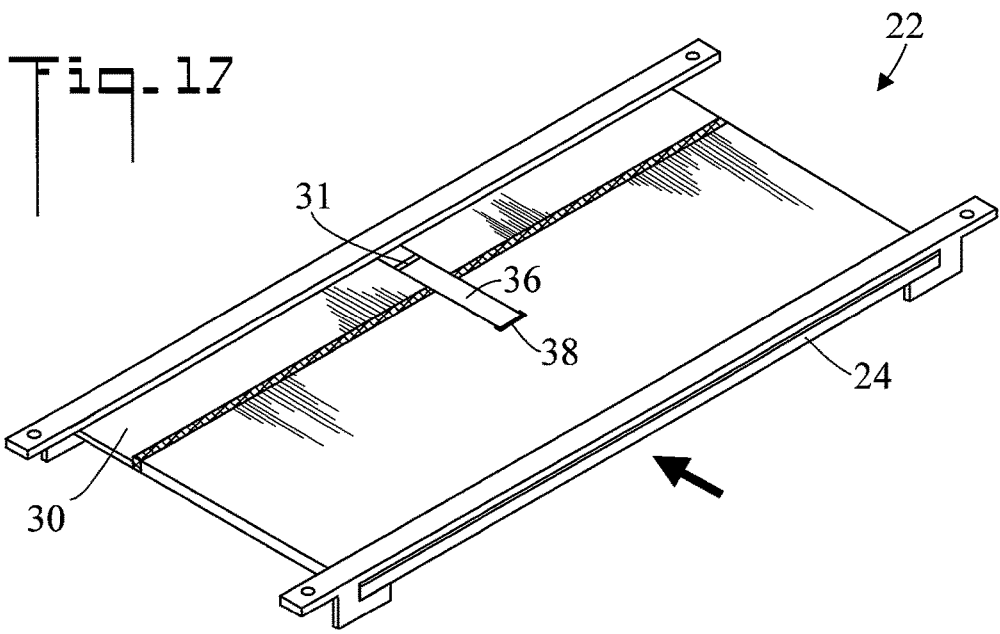
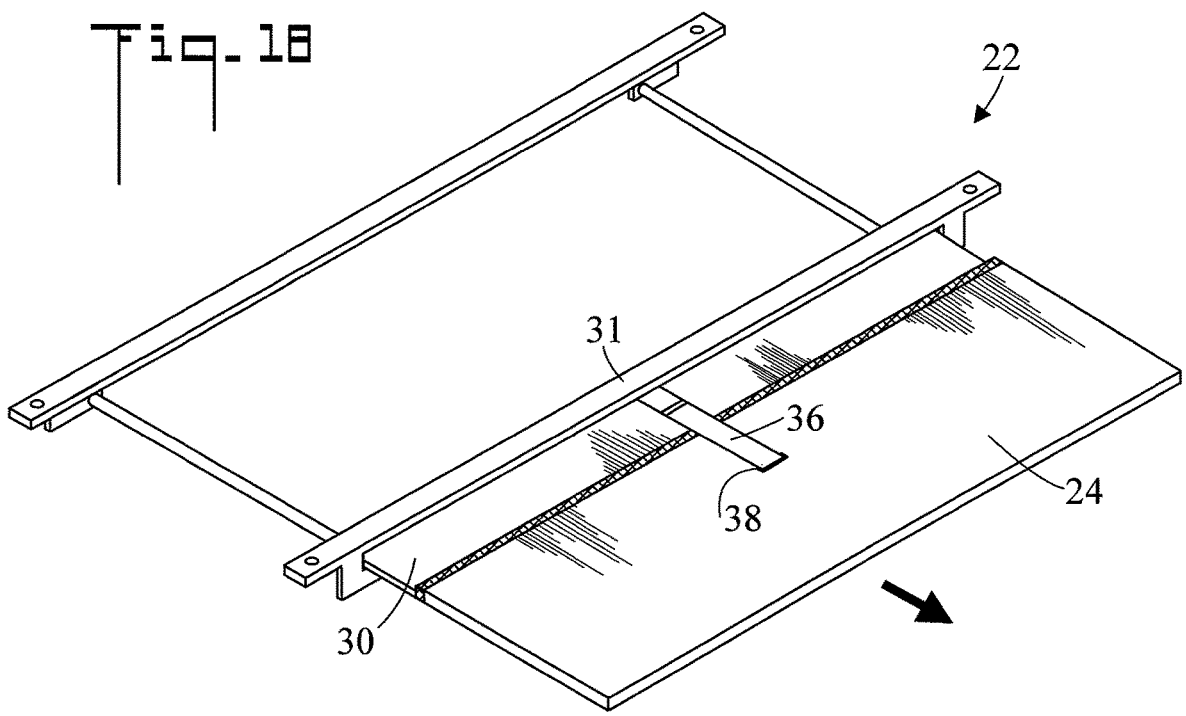

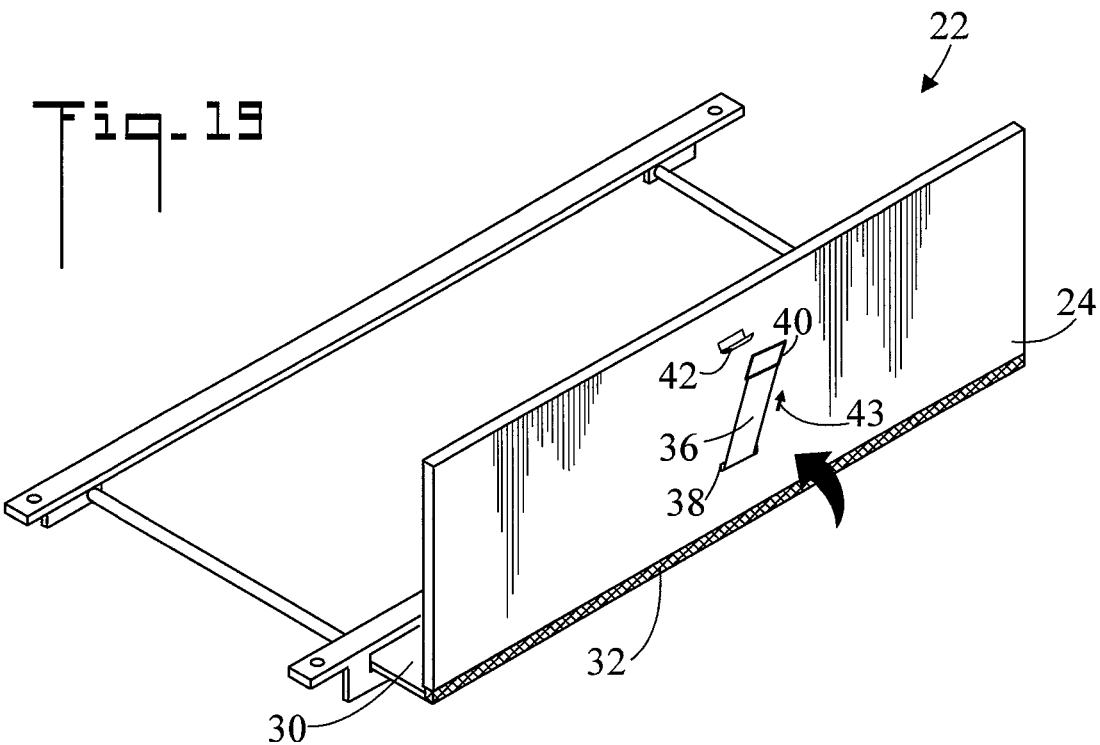
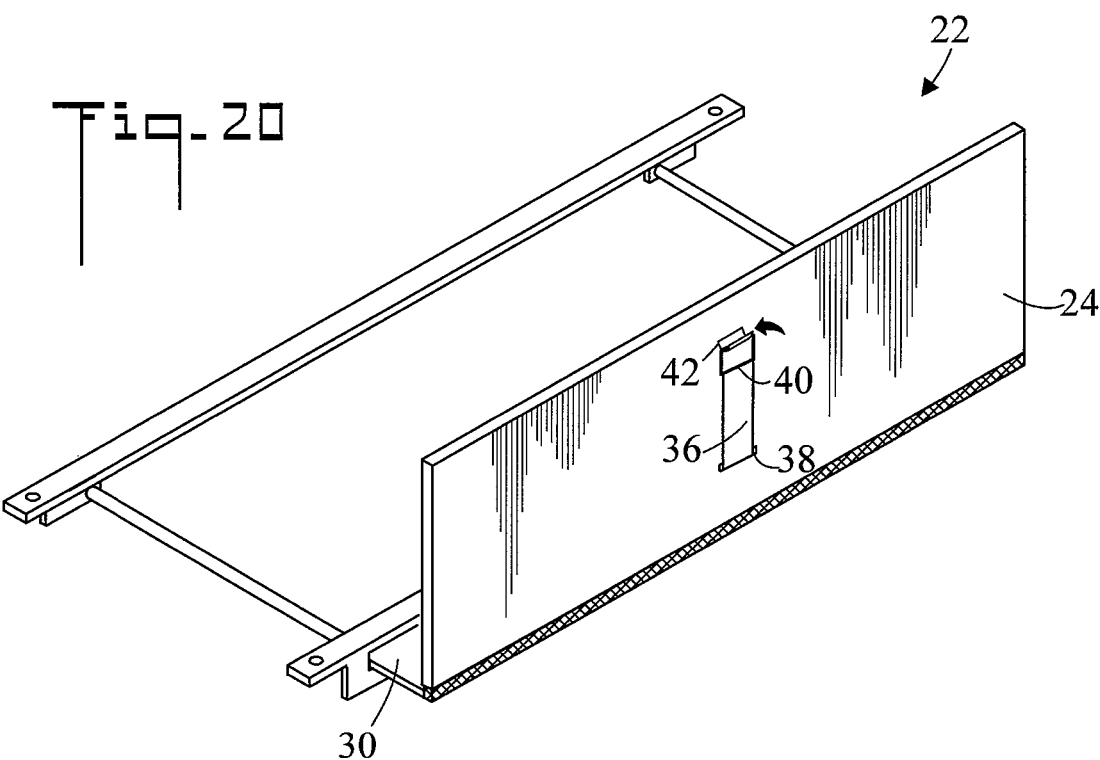

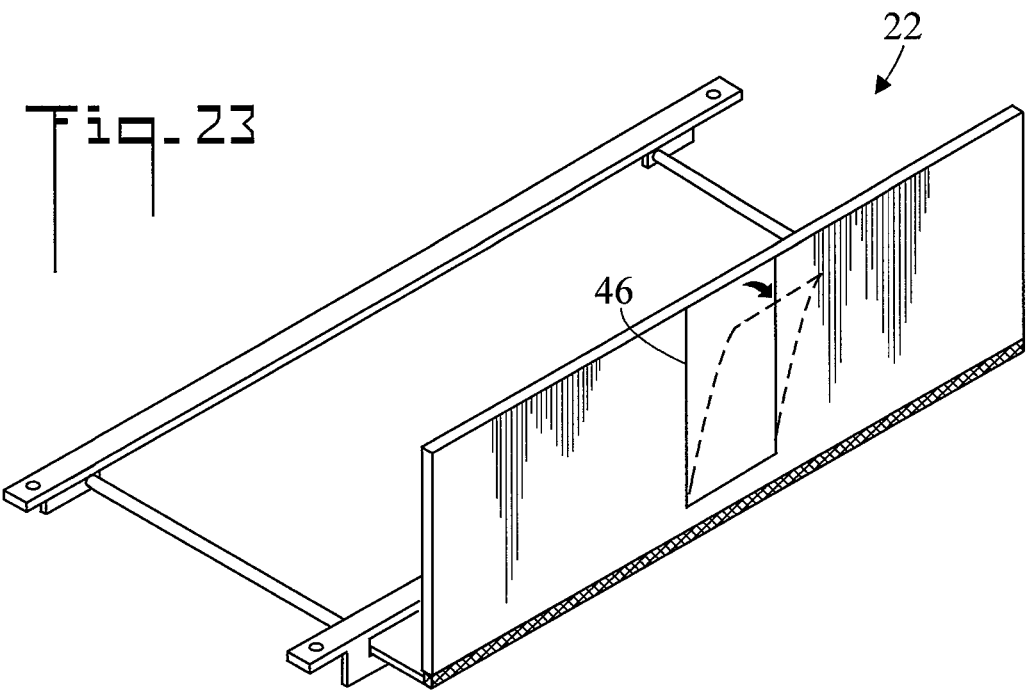
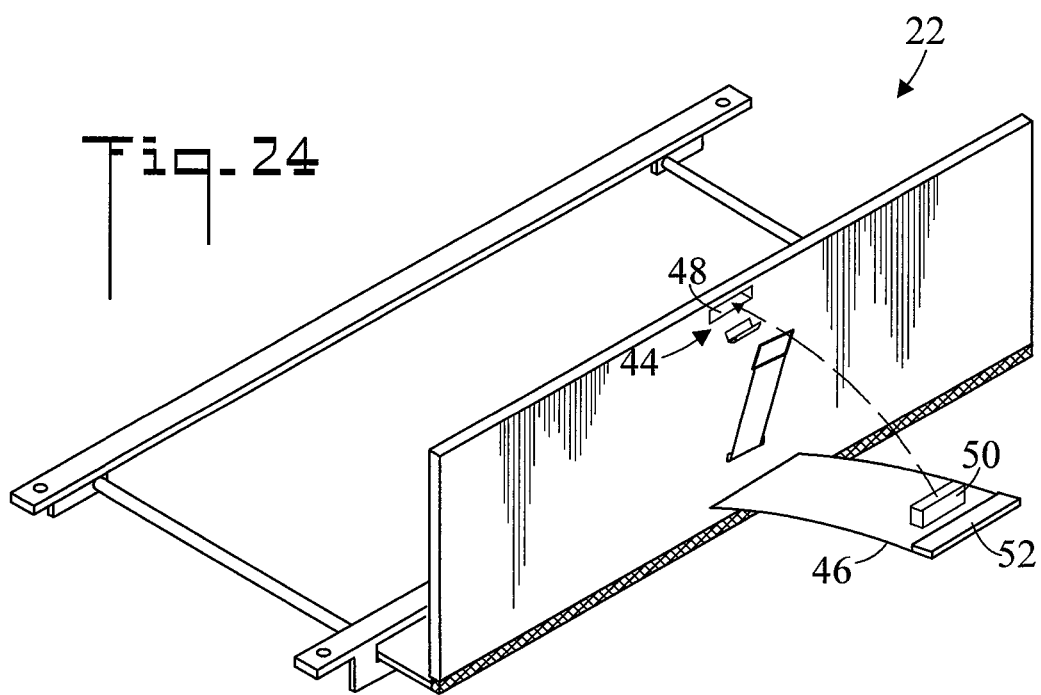

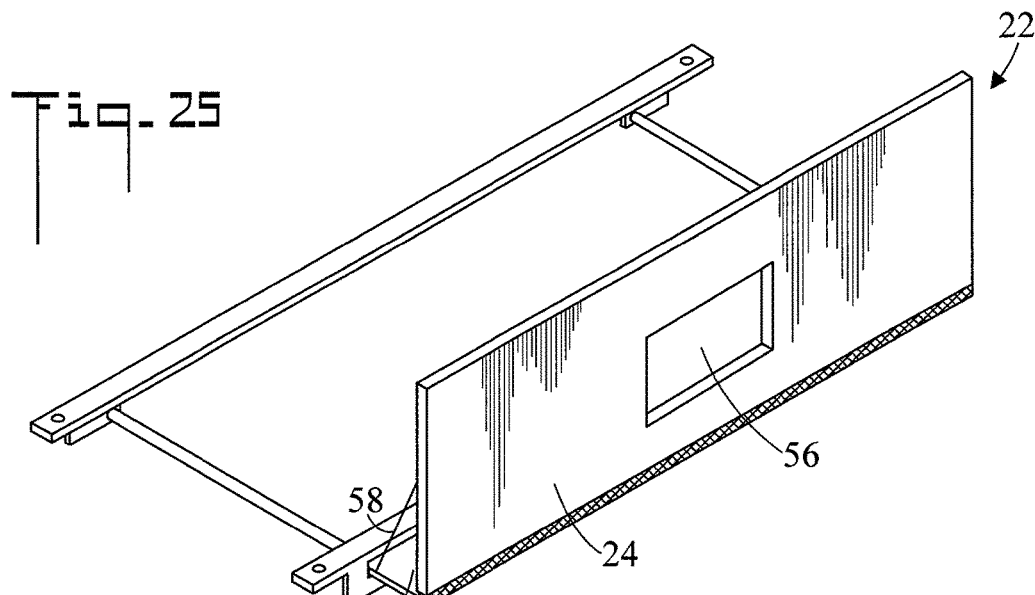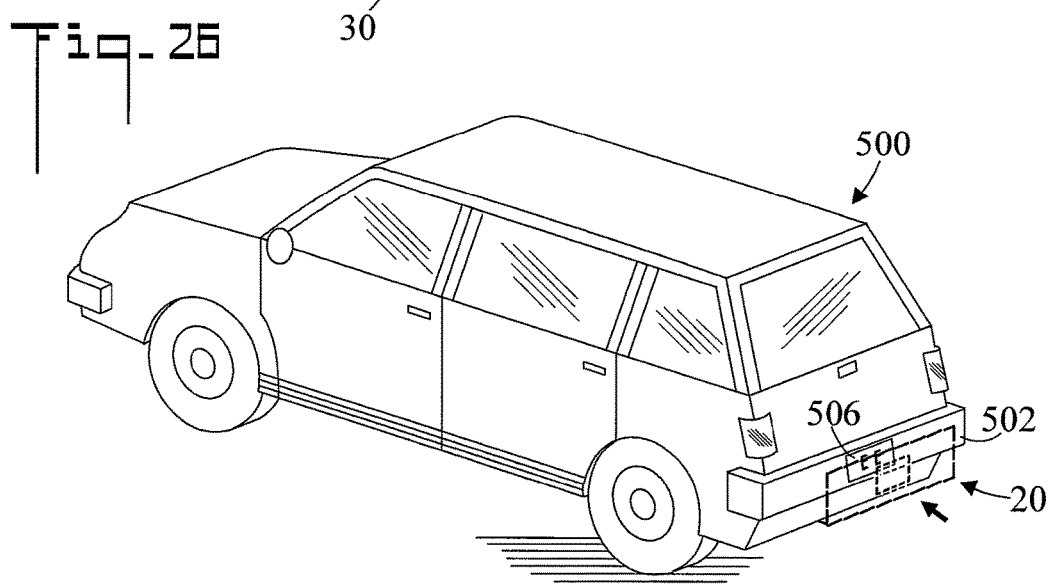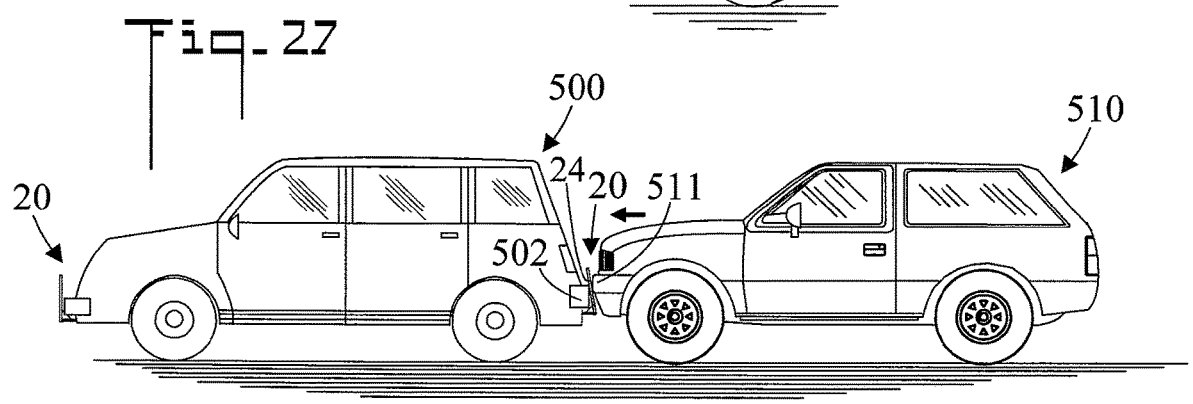

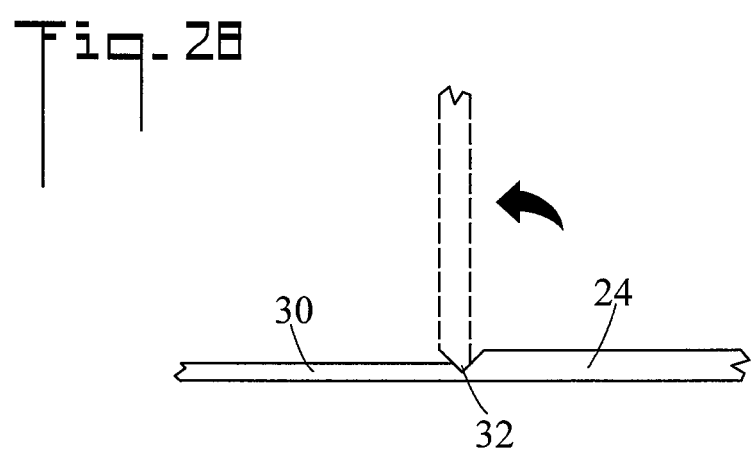

DEVICE FOR PROTECTING THE BUMPER OF A VEHICLE AND METHOD OF USE

CROSS REFERENCE TO RELATED APPLICATION

This application is a continuation of and claims the filing benefit under 35 U.S.C. § 120 of application Ser. No. 15/082,033, filed Mar. 28, 2016, which is hereby incorporated by reference. This application also claims the filing benefit under 35 U.S.C. § 119(e) of U.S. Provisional Application No. 62/178,461, filed Apr. 11, 2015, which is hereby incorporated by reference.

TECHNICAL FIELD

The invention generally pertains to motor vehicles, and more particularly to a bumper protector which protects the bumper of the vehicle.

BACKGROUND OF THE INVENTION

The bumpers of vehicle can be damaged by minor collisions with other vehicles. Such collisions typically occur during the parallel parking of vehicles on streets where parking space is limited. In order to park a vehicle in a tight space, it is often difficult or even impossible not to bump the vehicle which is in front of or behind the parking space. These bumps can leave dents, scratches, and mares on the bumpers of both involved vehicles.

BRIEF SUMMARY OF THE INVENTION

The present invention is directed to a device for protecting the bumper of a vehicle. The device has a cushion (pad) which is positionable alongside the bumper. The cushion absorbs and distributes impact and prevents the bumper from being dented, scratched, or marred. The device is typically placed in an in-use position after a vehicle is parked to protect its bumper from a bump from another vehicle. It is placed in a stored position underneath the vehicle during driving and when bumper damage is not an issue. The device can also be placed in the in-use position before the user parks his or her vehicle, thereby preventing damage to the bumper during the parking process.

In accordance with an embodiment, a device for protecting the bumper of a vehicle having an undercarriage includes a bumper protector which is connectable to the undercarriage of the vehicle, the bumper protector including:
 a cushion;
 the bumper protector is connectable to the undercarriage of the vehicle, the cushion is positionable to (1) a retracted position beneath the undercarriage of the vehicle, and (2) an extended position outwardly projecting from the vehicle; and,
 in the extended position the cushion is rotatable to an upright position adjacent to the bumper of the vehicle.

In accordance with another embodiment, the vehicle has a longitudinal axis and the cushion has a longitudinal axis. The longitudinal axis of the cushion is perpendicular to the longitudinal axis of the vehicle.

In accordance with another embodiment, a second vehicle is positionable to collide with the vehicle, the second vehicle has a second bumper. The cushion is configured to be sandwiched between the bumper of the vehicle and the bumper of the second vehicle.

In accordance with another embodiment, the cushion is fabricated from a shock absorbing material.

In accordance with another embodiment, the cushion is fabricated from rubber having embedded reinforcing rods.

In accordance with another embodiment, a user cooperates with the device, The cushion is configured to be pulled out to the extended position by the user.

Other embodiments, in addition to the embodiments enumerated above, will become apparent from the following detailed description, taken in conjunction with the accompanying drawings, which illustrate, by way of example, the principles of the device and method of use.

BRIEF DESCRIPTION OF THE DRAWINGS

FIG. 4 is an enlarged breakaway side elevation view of area 4 of FIG. 1;

FIG. 5 is an enlarged breakaway side elevation view of the device in an intermediate pulled out position;

FIG. 6 is an enlarged breakaway view of area 6 of FIG. 3;

FIG. 7 is a fragmented bottom plan view of the undercarriage of the vehicle with the device installed and in the stored position;

FIG. 8 is a top plan view of the bumper protector with a cushion in the retracted position;

FIG. 9 is a front elevation view as in FIG. 8;

FIG. 10 is a side elevation view as in FIG. 8;

FIG. 11 is an enlarged cross sectional view along the line 11-11 of FIG. 10;

FIG. 12 is a top plan view of the bumper protector with the cushion in an extended position;

FIG. 13 is a side elevation view as in FIG. 12;

FIG. 14 is an enlarged cross sectional view along the line 14-14 of FIG. 12;

FIG. 15 is a side elevation view of the cushion rotated to an upright position;

FIG. 16 is a bottom plan view of the bumper protector with the cushion in the retracted position;

FIG. 17 is a perspective view of the bumper protector with the cushion in the retracted position;

FIG. 18 is a perspective view of the bumper protector with the cushion in the extended position;

FIG. 19 is a perspective view of the cushion rotated to the upright position with an unconnected retainer;

FIG. 20 is a perspective view as in FIG. 19 with the retainer connected;

FIG. 23 is a perspective view of the bumper protector with the mud flap;

FIG. 24 is another perspective view of the bumper protector and the mud flap;

FIG. 25 is a perspective view of the cushion with a license plate aperture; and, FIG. 26 is a perspective view of a vehicle having a license plate;

FIG. 27 is a reduced side elevation view of the bumper protector protecting the bumper from a collision with another vehicle; and, FIG. 28 is an enlarged fragmented side elevation view of an embodiment of a hinge.

DETAILED DESCRIPTION OF THE INVENTION

Figure 1:
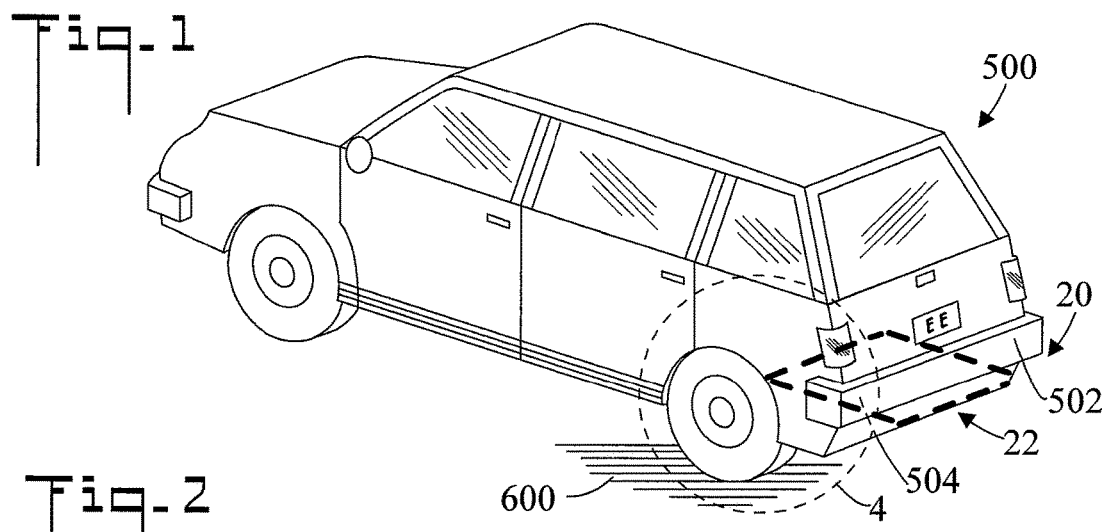
FIG. 1 is a rear perspective view of a prior art vehicle with a device for protecting the bumper of the vehicle connected to the undercarriage of the vehicle, the device in a stored position.
Figure 2:
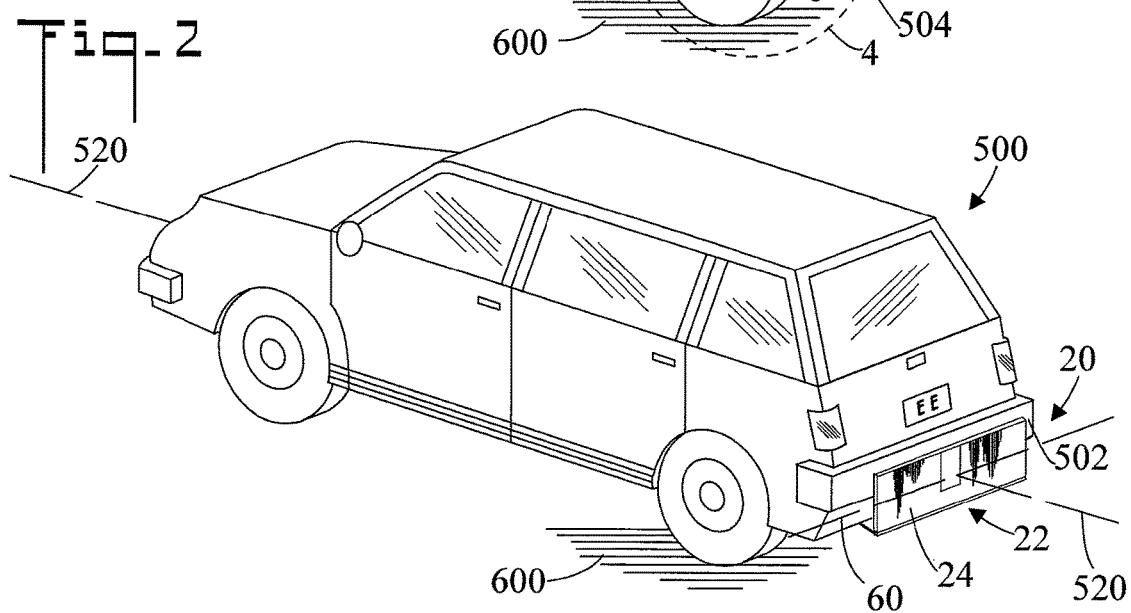
FIG. 2 is a rear perspective view with the device in an in-use position.
Figure 3:
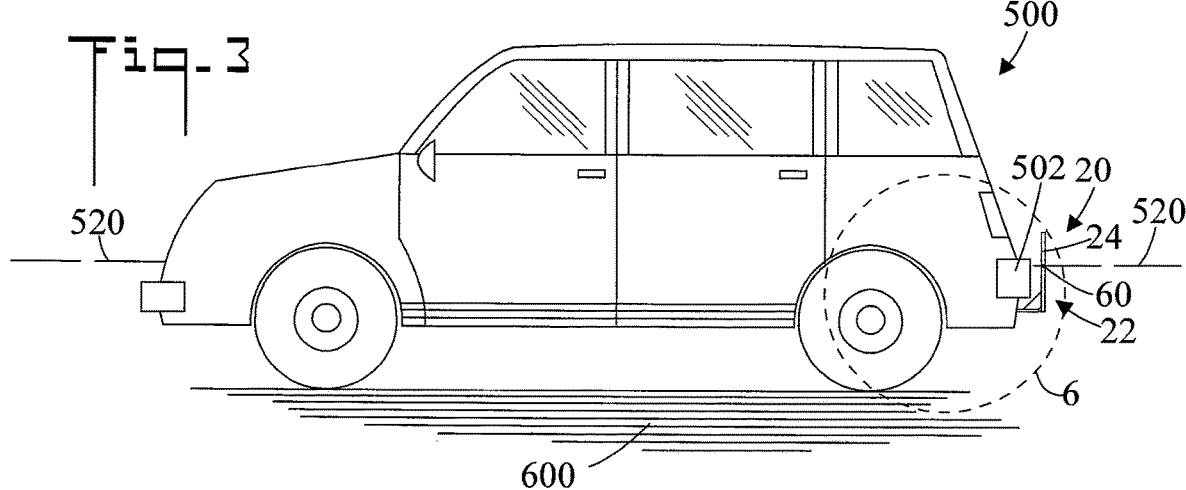
FIG. 3 is a side elevation view as in FIG. 2.

Referring initially to FIG. 1, there is illustrated a rear perspective view of a prior art vehicle 500 having a bumper 502 and an undercarriage 504 (the supporting frame under the main body of vehicle 500), with a device 20 for protecting the bumper 502 installed. Device 20 includes a bumper protector 22 which is connectable to undercarriage 504 of the vehicle 500. In FIG. 1, device 20 is in a stored position. FIG. 2 is a rear perspective view of the vehicle 500 with device 20 in an in-use position, and FIG. 3 is a side elevation view as in FIG. 2. FIG. 4 is an enlarged breakaway side elevation view of area 4 of FIG. 1, FIG. 5 is an enlarged breakaway side elevation view of device 20 in an intermediate pulled out position, and FIG. 6 is an enlarged breakaway view of area 6 of FIG. 3. Vehicle 500 can be any motor vehicle such as an automobile, truck, van, SUV, or the like. Vehicle 500 is disposed upon a support surface 600 such as a street, parking lot, driveway, etc. Bumper protector 22 includes a cushion 24. In the stored position of FIG. 1, cushion 24 is disposed out of the way beneath the undercarriage 504 of vehicle 500. In the in-use position of FIG. 2, cushion 24 is pulled out from beneath undercarriage 504, and cushion 24 is rotated to an upright position to protect bumper 502 from a collision. Cushion 24 serves to protect bumper 502 by absorbing and distributing the impact of another object, and particularly the impact caused by the bumper of another vehicle (also refer to FIG. 27).

Cushion 24 is positionable to (1) a retracted position where it resides beneath the undercarriage 504 of the vehicle (refer to FIG. 4), and (2) an extended position outwardly projecting from the vehicle 500 (refer to FIG. 5). That is, cushion 24 is pulled straight out from beneath undercarriage 504 (refer to FIG. 5). In the extended position cushion 24 is then rotatable to an upright position outside the bumper 502 of the vehicle 500 (refer to FIG. 6). In other words when cushion 24 is in the upright position it is disposed adjacent to (next to) bumper 502, and bumper 502 is disposed between cushion 24 and the main body of vehicle 500. In this position, cushion 24 protects bumper 502 from collisions with external objects. It is noted in FIGS. 2-6 that cushion 24 is substantially planar, and that in the retracted position of FIG. 4 cushion 24 is disposed parallel to support surface 600. That is, in the retracted position on a level support surface 600 cushion 24 is substantially horizontal. In the upright position cushion 24 will be substantially vertical if vehicle 500 is disposed upon a level (not angled) support surface 600. Referring to FIGS. 2 and 3 it is noted that vehicle 500 has a longitudinal axis 520, and cushion 24 has a longitudinal axis 60. The longitudinal axis 60 of cushion 24 is perpendicular to the longitudinal axis 520 of the vehicle 500.

FIG. 7 is a fragmented bottom plan view of the undercarriage 504 of the vehicle 500 with the device 20 installed and cushion 24 in the retracted position. Device 20 further includes a connector 26 for connecting bumper protector 22 to the undercarriage 504 of vehicle 500. In the shown embodiment connector 26 includes a plurality of bolts which connect bumper protector 22 to undercarriage 504. However it may be appreciated that bumper protector 22 could be connected in any convenient mechanical manner such as with bolts, screws, brackets, flanges, clamps, wires, metal tapes, or the like, or a combination of these. The specific manner of connection will depend upon the particular configuration of undercarriage 504. Generally speaking, bumper protector 24 will be connected under the cargo area of vehicle 500, however it can also be connected under the front of vehicle 500 to protect the front bumper (refer to FIG. 27).

FIGS. 8-10 are top plan, front elevation, and side elevation views respectively of bumper protector 22 with cushion 24 in the retracted position. FIG. 11 is an enlarged cross sectional view along the line 11-11 of FIG. 10. Cushion 24 can be fabricated from rubber, a polymer, or other shock absorbing material which has a soft surface so that it will not scratch or mare bumper 502. In an embodiment, cushion 24 is made from rubber with embedded reinforcing members (such as metal rods or a metal mesh) so that it keeps its shape. Cushion 24 is designed such that it will remain in the retracted position until it is pulled out to the extended position by the user.

FIGS. 12-13 are top plan, and side elevation views respectively of the bumper protector 22 with cushion 24 in the extended position, and FIG. 14 is an enlarged cross sectional view along the line 14-14 of FIG. 12. Also referring to FIGS. 10 and 11, bumper protector 22 includes a slide mechanism which carries cushion 24 such that in the retracted position cushion 24 slides beneath the undercarriage 504 of the vehicle 500 (refer to FIG. 4), and in the extended position cushion 24 slides out from beneath the undercarriage 504 of vehicle 500 (refer to FIG. 5). In the shown embodiment, the slide mechanism includes a pair of rails 28 and a sliding member 30 which slides along rails 28. In the shown embodiment rails 28 are tubes as is shown in FIG. 14, however rods or other forms of rails could also be utilized. Rails 28 are connected together by a pair of cross members 29, which in the shown embodiment include mounting holes 27 to effect the connection of bumper protector 22 to undercarriage 504 (refer to FIG. 7). In an embodiment cushion 24 has a width W of between about 24 and 48 inches depending upon the vehicle bumper 502 being protected, and a thickness T of between about 0.5 and 1.0 inches.

Cushion 24 is rotatably connected to sliding member 30 by a hinge 32 which allows cushion 24 to be rotated (pivoted with respect to sliding member 30) to the upright position of FIGS. 2, 3, and 6. In the shown embodiment hinge 32 is a flexible seam such as made from heavy-duty fabric or other resiliently bendable material. However it may be appreciated that hinge 32 could take other forms such as a barrel hinge, continuous hinge, and the like (refer also to FIG. 28 and the associated discussion). Sliding member 30 includes two sliders 34. Sliders 34 each slidably receive one rail 28 which allows sliding member 30 to slide along rails 28. As shown, in the retracted position of FIG. 10 slider 34 has moved all the way to left along rails 28 (retracted position of cushion 24), and in FIG. 13 slider 34 has moved all the way to the right along rails 28 (extended position of cushion 24). Cross members 29 prevent slider 34 from coming off of rail 28. FIG. 11 shows the relationship of sliding member 30, slider 34, and rail 28.

FIG. 15 is a side elevation view of cushion 24 rotated to the upright position (refer also to FIGS. 2, 3, and 6). Shown are cushion 24, rail 28, cross members 29, sliding member 30, hinge 32, and slider 34.

FIG. 16 is a bottom plan view of bumper protector 22 with cushion 24 in the retracted position. Also shown are rails 28, cross members 29, sliding member 30, hinge 32, and slider 34.

FIG. 17 is a perspective view of bumper protector 22 with cushion 24 in the retracted position, FIG. 18 is a perspective view of bumper protector 22 with cushion 24 in the extended position, FIG. 19 is a perspective view of cushion 24 rotated to the upright position with an unconnected retainer for holding cushion 24 in the upright position, and FIG. 20 is a perspective view as in FIG. 19 with the retainer connected. In the shown embodiment the retainer is a strap 36. One end of strap 36 is fixedly connected to sliding member 30 at 31. Strap 36 then passes thorough an aperture 38 in cushion 24. A loop 40 (rectangular as shown) is connected to the opposite end of strap 36. A hook 42 is connected to cushion 24. In FIG. 18 as cushion 24 is rotated to upright position, strap 36 is pulled up through aperture 38 in direction 43. Then in FIG. 20, loop 40 is pulled over hook 42 to hold cushion 24 in the upright position (also refer to FIG. 15). In may be appreciated that other types of retainers could be utilized to hold cushion 24 in the upright position, such as cables, wires, clips, chains, pins, ratchets, or the like (also refer to FIG. 25). It may be appreciated that a view from the opposite side will be the mirror image of that shown in FIGS. 17-20.

Figure 21:
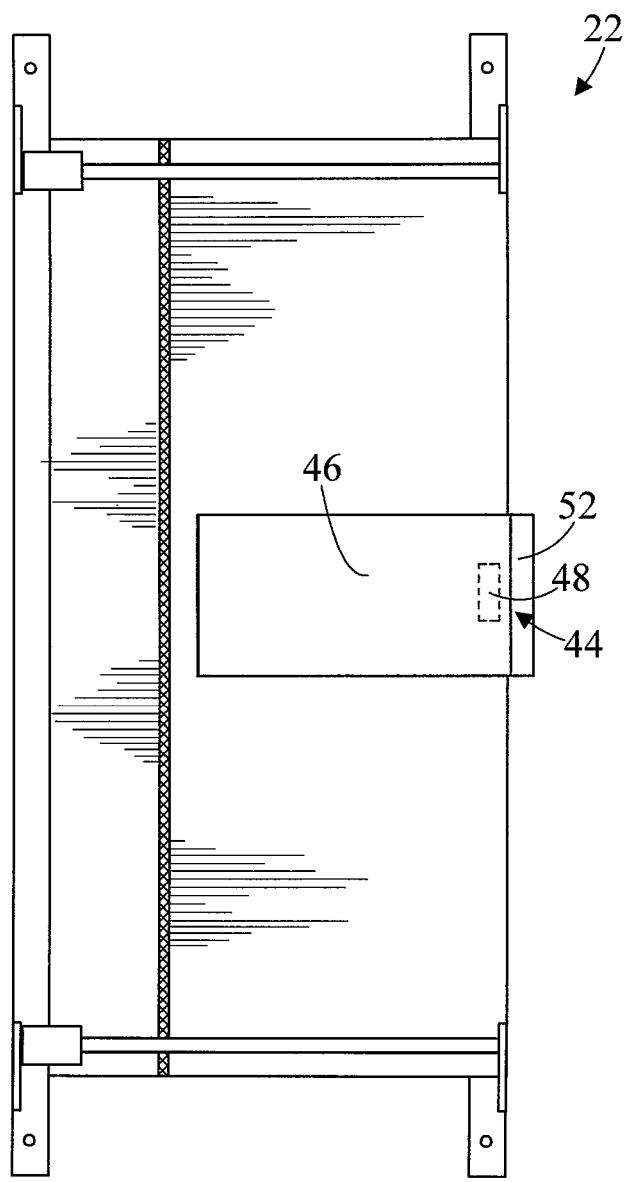
FIG. 21 is a bottom plan view of the bumper protector having a mud flap.
Figure 22:
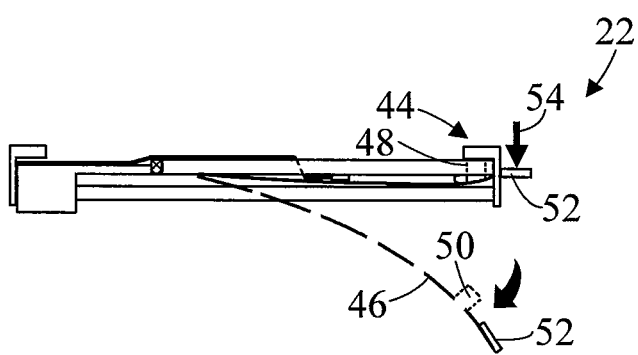
FIG. 22 is a side elevation view of FIG. 21.

FIGS. 21-23 are bottom plan, side elevation, and perspective views respectively of bumper protector 22 having a handle 44 and a mud flap 46 which removably covers handle 44. In the shown embodiment handle 44 includes an aperture 48 which can receive the fingers of a user. Handle 44 is used for placing cushion 24 in the retracted position, for placing cushion 24 in the extended position, and for rotating cushion 24 to the upright position. To hold mud flap 46 in place over handle 44, mud flap 46 has a plug 50 which is snuggly removably received by aperture 48 in cushion 24. In order to release mud flap 46 when cushion 24 is in the retracted position (FIG. 22), mud flap 46 includes a release 52 which extends past the edge of cushion 24. Release 52 can be activated by the foot of the user in downward direction 54 as is shown in FIG. 22, wherein plug 50 is forced out of aperture 48 and mud flat 46 falls down due to gravity. Mud flap 46 is useful in covering handle 44 so that handle 46 will remain clean and not become covered with road dirt, oil, and grime. As such, the user's hand will not become soiled when positioning cushion 24.

FIG. 24 is another perspective view of bumper protector 22, handle 44, and mud flap 46. Also shown are aperture 48, plug 50, and release 52.

FIG. 25 is a perspective view of cushion 24 with a license plate aperture 56, and FIG. 26 is a perspective view of a vehicle 500 having a license plate 506. In the shown embodiment, license plate 506 is disposed on the bumper 502 of vehicle 500. License plate aperture 56 permits the license plate 506 to be viewed from behind the vehicle 500. It is noted that in this embodiment cushion 24 is held in the upright position by a cable 58 which is connected between sliding member 30 and cushion 24. This is because the strap 36 of FIG. 20 would interfere with the view of license plate 506. In another embodiment, the cable 58 could connect cushion 24 to vehicle 500 such as to a license plate holder.

FIG. 27 is a reduced side elevation view of device 20 protecting the bumper 502 of vehicle 500 from a collision with a second vehicle 510 having a second bumper 511. Cushion 24 is configured to be sandwiched (pressed) between bumper 502 of the vehicle 500 and the bumper 511 of the second vehicle 510. It is noted that device 20 protector 22 can also be installed on the front of vehicle 500 to protect the front bumper.

FIG. 28 is an enlarged fragmented side elevation view of an embodiment of hinge 32. In this embodiment cushion 24 and sliding member 30 are fabricated from a continuous piece of material (such as rubber). Hinge 32 includes a groove between cushion 24 and sliding member 30. The groove allows cushion 24 to be rotated (folder) with respect to sliding member 30 to the upright position shown in broken lines.

In another embodiment device 20 is combined with vehicle 500 to form a system for protecting the bumper 502 of the vehicle 500.

In terms of use, a method for protecting the bumper 502 of a vehicle 500 includes:

(a) providing a vehicle 500 having a bumper 502 and an undercarriage 504;

(b) providing a device 20 for protecting the bumper 502 of the vehicle 500 including;

a bumper protector 22 which is connectable to the undercarriage 504 of the vehicle 500, the bumper protector 22 including:

a cushion 24;

when the bumper protector 22 is connected to the undercarriage 504 of the vehicle 500, the cushion 24 is positionable to (1) a retracted position beneath the undercarriage 504 of the vehicle 500, and (2) an extended position outwardly projecting from the vehicle 500; and, when in the extended position the cushion 24 is rotatable to an upright position adjacent to the bumper 502 of the vehicle 500;

a slide mechanism which carries the cushion 24 such that in the retracted position the cushion 24 slides beneath the undercarriage 504 of the vehicle 500, and in the extended position the cushion 24 slides out from beneath the undercarriage 504 of the vehicle 500;

a connector 26 for connecting the bumper protector 22 to the undercarriage 504 of the vehicle 500;

(c) using the connector 26 to connect the bumper protector 22 to the undercarriage 504 of the vehicle 500;

(d) placing the cushion 24 in the retracted position;

(e) placing the cushion 24 in the extended position; and, (f) when in the extended position, rotating the cushion 24 to the upright position.

The method with a user implementing the method, the method further including:

in (e), the user pulling the cushion 24 out to the extended position.

The method further including:

in (a), the vehicle 500 having a longitudinal axis 520;

in (b), the cushion 24 having a longitudinal axis 60; and, in (c), the bumper protector 22 connected to the undercarriage 504 of the vehicle 500 so that the longitudinal axis 60 of the cushion 24 is perpendicular to the longitudinal axis 520 of the vehicle 520.

The method further including:

in (b), the cushion 24 fabricated from a shock absorbing material.

The method further including:

a second vehicle 510 positionable to collide with the vehicle 500, the second vehicle 510 having a second bumper 511;

in (b), the cushion 24 configured to be sandwiched between the bumper 502 of the vehicle 500 and the bumper 511 of the second vehicle 510; and, after (f), the second vehicle 510 colliding with the vehicle 500 wherein the cushion 24 is sandwiched between the bumper 502 of the vehicle 500 and the second bumper 511 of the second vehicle 510.

The method further including:

after (f), parking the vehicle 500.

The embodiments of the device and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is defined by the appended claims.

I claim:

1. A device for protecting the bumper of a vehicle having an undercarriage, the device comprising:
a bumper protector which is connectable to the undercarriage of the vehicle, said bumper protector including:
a cushion;
said cushion positionable to (1) a retracted position beneath the undercarriage of the vehicle, and (2) an extended position outwardly projecting from the vehicle;
in said extended position said cushion is rotatable to an upright position adjacent to and alongside the bumper of the vehicle; and,
said cushion having a handle for placing said cushion in said retracted position, for placing said cushion in said extended position, and for rotating said cushion to said upright position.

2. The device according to claim 1, further including:
said handle including an aperture in said cushion.

* * * * *